(12) United States Patent
Unsicker

(10) Patent No.: US 9,253,744 B2
(45) Date of Patent: Feb. 2, 2016

(54) METHOD FOR TRANSMITTING INFORMATION TO SYNCHRONIZE A USE BETWEEN A MOBILE TELEPHONE AND A RECEIVER

(71) Applicant: Merkur Media GmbH, Munich (DE)

(72) Inventor: Andreas Unsicker, Regensburg (DE)

(73) Assignee: FRIENDS4MEDIA GMBH, Regensburg (DE)

( * ) Notice: Subject to any disclaimer, the term of this patent is extended or adjusted under 35 U.S.C. 154(b) by 70 days.

(21) Appl. No.: 14/355,008

(22) PCT Filed: Oct. 10, 2012

(86) PCT No.: PCT/DE2012/000985
§ 371 (c)(1),
(2) Date: Aug. 18, 2014

(87) PCT Pub. No.: WO2013/064133
PCT Pub. Date: May 10, 2013

(65) Prior Publication Data
US 2015/0004957 A1    Jan. 1, 2015

(30) Foreign Application Priority Data

Oct. 31, 2011 (DE) .......................... 10 2011 117283

(51) Int. Cl.
*H04M 3/00*      (2006.01)
*H04M 1/725*     (2006.01)
*H04W 56/00*     (2009.01)

(52) U.S. Cl.
CPC ........ *H04W 56/001* (2013.01); *H04M 1/72519* (2013.01); *H04W 56/00* (2013.01)

(58) Field of Classification Search
CPC .............................. H04W 56/0085; H04L 7/00
USPC .......................................................... 455/418
See application file for complete search history.

(56) References Cited

U.S. PATENT DOCUMENTS

2006/0251127 A1*  11/2006  Ishida ..................... G04C 5/002
                                                         370/503
2009/0125630 A1*   5/2009  Gogic ............... H04W 56/0085
                                                         709/227

FOREIGN PATENT DOCUMENTS

EP    1852981 A1    11/2007
GB    2413036 A     10/2005
WO    02/45290 A2    6/2002

* cited by examiner

*Primary Examiner* — Thomas Lett
(74) *Attorney, Agent, or Firm* — Karin L. Williams; Mayer & Williams PC

(57) ABSTRACT

A method for transmitting information between a mobile telephone having an internal device time, and a recipient having an internal time standard, includes: A) telephone transmits a query signal to recipient, B) recipient reads out the internal time standard and sends to telephone, C) a time difference delta-t1 between the internal device time and the received time data is calculated/stored, D) apply time is set to the value of the internal device time minus delta-t1, E) data stream is sent to the recipient, including apply time at time of pressing a key, F) apply time of E) is read-out from the stream and compared with predetermined maximum time, G) if apply time is earlier/simultaneous with the maximum time, further processing of data stream is carried out; if apply time is later than the maximum time, a warning signal is generated/assigned to the data stream of E) and stored.

20 Claims, No Drawings

METHOD FOR TRANSMITTING INFORMATION TO SYNCHRONIZE A USE BETWEEN A MOBILE TELEPHONE AND A RECEIVER

FIELD OF THE INVENTION

The invention relates to a method for transmitting information between a sender and a recipient by means of a mobile telephone, the telephone having an internal device time, the recipient having means for receiving data streams sent by the mobile telephone, means for transmitting data streams to the mobile telephone, and an internal time standard. The invention further relates to a program encoding such a method and to a mobile telephone having storage means, in which such a program is encoded.

BACKGROUND OF THE INVENTION AND PRIOR ART

Mobile telephones are known in the practice. These also include the so-called smartphones, which are capable of performing many additional functions besides the actual telecommunication functions in the strict sense. Such smartphones comprise processor systems, in the storage means of which various application programs, so-called apps, can be stored.

Mobile telephones have internal clocks, which specify, show and constantly update the internal device time. This internal device time is not necessarily required for calls, but is used for many functions of a mobile telephone, from telephone-internal protocol routines to sending time information in connection with application programs.

In some applications it is desirable that a review of the real time of an application can be detected and reconstructed. This is especially true in cases where in an application a data stream must be sent to a recipient within a predefined time window.

The resulting problem is that by the recipient, a real time for example based on atomic clocks or timing signals synchronized therewith can be generated and maintained. In contrast, mobile telephones usually include own time standards, which may have deviations from the real time. Thus, the device time of a mobile telephone may considerably differ from the real time. Consequently, a transmission of a data stream from the mobile telephone to a recipient within a time window cannot easily be verified, if the data stream only contains information about the timing of operation of the mobile telephone based on a read-out of the device time. This can ultimately cause erroneous further processing of such data streams, which, though generated within a predetermined time window of the real time, however contain a device time, which due to clock drifts is outside of the time window.

TECHNICAL OBJECT OF THE INVENTION

It is therefore the technical object of the invention to provide a method for transmitting information within a predetermined time window, which with high reliability ensures that information transmitted inside and outside of the time window is automatically detected and discriminated by the recipient.

In particular, the invention is based on the problem that, according to prior art, only the point in time of the reception of a data stream is detected by the recipient, and thus, due to transmission times or delays, a significant discrepancy between the actual point in time of transmission of the data stream and its reception time may occur.

Finally, the invention is based on the problem that the internal device time of a mobile telephone can considerably differ from a real time (at the recipient), and thus an additional transmission of the device time in the data stream will not only not solve the above problem, but may even increase said discrepancy.

BASICS OF THE INVENTION AND PREFERRED EMBODIMENTS

In order to solve this technical problem, the invention teaches a method for transmitting information between a sender and a recipient by means of a mobile telephone, the telephone having an internal device time, the recipient having means for receiving data streams sent by the mobile telephone, means for transmitting data streams to the mobile telephone, and an internal time standard, comprising the following steps: A) the mobile telephone transmits a query signal to the recipient, B) upon reception of the query signal, the recipient reads out the internal time standard and sends the read-out time data to the mobile telephone, C) in the mobile telephone, a time difference delta-t1 between the internal device time and the received time data is calculated and stored, D) in an application running in the mobile telephone, an apply time is set to the value of the internal device time minus delta-t1, E) a data stream generated by the application is sent to the recipient by pressing a key of the mobile telephone, a component of the data stream including the apply time at the time of pressing the key, F) in the recipient, the apply time of step E) is read-out from the received data stream and compared with a predetermined maximum time stored in the recipient, G) if the apply time of step F) is earlier than or simultaneous with the maximum time, further processing of the data stream of step E) is carried out, and if the apply time of step F) is later than the maximum time, a first warning signal is generated and assigned to the data stream of step E) and stored.

By means of the invention, it is achieved in combination that the transmission of a data stream is provided so to speak with a "time stamp" in the data stream (transmitted apply time), provided by the mobile telephone, this time stamp not being formed by the device time, but by an apply time adapted to the time standard of the recipient. Thus, the apply time is so to speak synchronized with the time standard of the recipient, not however the device time. This is also relevant, because a user usually will not wish to synchronize the device time in every application. Moreover, a change in the device time for the purpose of generating an incorrect time stamp would ultimately remain without influence, simply because the apply time is synchronized and not the device time.

A recipient is a technical device, which is designed for bidirectional exchange of data streams with mobile telephones. These include, in addition to transmitter and receiver modules, control modules, which on the one hand are designed for a selective exchange of data with one mobile telephone each, and typically processor systems containing, on the side of the recipient, programs for processing applications. Within an application, then the data exchange will take place between a specific mobile telephone and the recipient. The selectivity is ensured within the data stream from the mobile telephone to the recipient, for example, using the telephone number of the mobile telephone.

The format of the time in the device time, the apply time and the internal time standard of the recipient is in principle irrelevant, only essential is that all three times are equipped with the same time format. A time format may be, for example, the local time of mobile telephone and recipient, i.e. hours:minutes:seconds, possibly supplemented by the date. If the local time of the mobile telephone differs from that of the recipient, this is also taken into account by the method according to the invention, since the apply time is "corrected" accordingly.

The term time window indicates a predetermined maximum time. In addition, a predetermined minimum time may also be provided as a limit. Then all statements with respect to the maximum time and comparisons thereto will apply to the minimum time in an analogous or complementary manner.

The terms larger time and later time are synonymous. Accordingly, the terms smaller time and earlier time are synonymous. A maximum time is then a latest admissible time and a minimum time is an earliest admissible time.

By steps A) to C), it is achieved that the difference between the device time on the one hand and the internal time standard of the recipient is detected in an application and is taken into account when sending data streams by the mobile telephone. Thereby, a comparison between the time of operation of the mobile telephone to a predetermined time slot is made possible, regardless of any clock drifts between the device time of the mobile telephone and the internal time standard of the recipient. In other words, there is a synchronization of the apply time in the mobile telephone with the internal time standard of the recipient so that a verification, whether an operation of the mobile telephone in an application took place within a predetermined time window, is carried out with high reliability, and accordingly data streams can be discriminated as "in time" or "not in time".

A preferred embodiment of the invention is characterized in that steps A) to C) are carried out several times in succession and cyclic repetition, especially 2, 3, 4 or 5 times in succession and repetition, and for each cycle A) to C) a testdelta-t1 is measured, from all measured testdelta-t1 the smallest testdelta-t1 being calculated and used in step D) as delta-t1. This embodiment takes into account that the transmission time between the mobile telephone and the recipient is not necessarily practically zero. There may be different causes for high transmission times. For example, the wireless network, in which the mobile telephone is operated, may sometimes be congested for capacity reasons. This may lead to delays of data streams in the wireless network. In very rare exceptional cases, such delays may be several seconds up to a few minutes. In the case of such a time delay, though the apply time would be synchronized in steps A) to C) with the internal time standard of the recipient, however there would be a remaining (unknown) time delay in transmission. By means of the preferred embodiment, the probability of a disturbingly long transmission delay is reduced. For it is unlikely that in several cycles of steps A) to C) there is every time a long delay of the transmission. By that in the repetition of steps A) to C), a minimum value of the difference between device time and internal time standard of the recipient is determined, the minimum transmission time having occurred in the cycles is detected and taken into account, which typically is in the range of seconds, in most cases less than 5 s, typically less than 3 s. Thus, it is ensured that apply time and internal time standard of the recipient differ from each other at most by such delay times.

In another embodiment of the invention, steps E) to G) can each be repeated several times in cycles, a later maximum time being predetermined for each subsequent cycle and stored in the recipient.

Furthermore, it is preferred if upon reception of the data stream by the recipient, a reception time is read-out in step F) from the internal time standard, and if the reception time determined in step F) is smaller than or equal to the maximum time, further processing of the data stream of step E) takes place, and if the reception time determined in step F) is greater than the maximum time, a second warning signal is generated and assigned to the data stream of step E) and stored. With this variant, an additional verification with regard to an operation within a predetermined time window is ensured. When generating the first warning signal as well as the second warning signal, a final warning signal can be generated and assigned to the data stream of step E). Thereby, a further improvement of the reliability is achieved. Particularly in the case of multiplied generation of a second warning signal, a separate verification can be initiated. Thus, it can be provided, for example, that if the second warning signal is generated in more than 50% of the repeated cycles E) to G), a third warning signal is generated, which is displayed for an operator of the recipient, so that any irregularities and/or systemic transmission errors in the wireless network can be checked.

When comparing steps G) or according to claim 4, waiting periods may also be provided, i.e. a maximum excess of the maximum time is still allowed, without a warning signal being initiated thereby. Such a waiting period is preferably in the range from 1 to s, in particular 1 to 10 s, for example, 1 to 5 s.

The invention further relates to a computer program encoding the steps and step components to be performed in the mobile telephone according to a method according to the invention, stored in storage means of the mobile telephone, and to a mobile telephone, comprising a processor system having storage means, wherein in said storage means a program according to the invention is stored.

In the following, the invention is described in more detail with reference to non-limiting examples of execution.

EXAMPLE 1

Generating Delta-t1 and the Apply Time

Upon operation of the mobile telephone, such as by keys or touchscreen, in an application, for example by an operator, who is queried by the application, for the purpose of initialization or synchronization of the application, to perform such operation, the mobile telephone sends a data stream to the recipient, which encodes a query for transmission of time data of the internal time standard of the recipient. Upon reception of this query signal, the recipient will read the internal time standard and will send the read time data to the mobile telephone. In the mobile telephone, now the time difference delta-t1 between the internal device time and the received time data is calculated. In the current application, the apply time is now set to the value of the internal device time minus delta-t1, wherein delta-t1 may have different signs, depending on whether the internal device time precedes or lags the time signal. Herein, delays and thus variations in the synchronization between apply time and internal time standard of the recipient will result, on one hand by transmission times in the wireless network and on the other hand by processor times when processing the program instructions. While these latter delays are practically negligible and are in ranges of less than 1 s, the former delays may be 1 s and more. However, typically 1-5 s are not exceeded, but in some cases longer transmission delays cannot be excluded.

EXAMPLE 2

Generating Delta-t1 and the Apply Time by Multiple Queries

In order to exclude random long-term transmission times, as mentioned in Example 1, or to minimize the risks thereof, the steps of the query and time difference determination, as described in Example 1, are carried out several times. This may be 2 to 5 times, but also up to 10, 20 times or even more often.

If now, when determining the time difference, a lag of the device time of the mobile telephone relative to the internal time standard of the recipient in detected, then the maximum time difference from the multiple determinations of the time differences is set to delta-t1 and is further used.

Vice versa, if when determining the time difference, it is found that the device time of the mobile telephone precedes the internal time standard of the recipient, then the minimum time difference from the multiple determinations of the time differences is set to delta-t1 and is further used.

The above relationships can also be used vice versa, depending on the selected sign of the measured time differences.

EXAMPLE 3

Verification of the time window compatibility of operations of the mobile telephone.

The invention claimed is:

1. A method for transmitting information between a sender and a recipient by means of a mobile telephone, the telephone having an internal device time, the recipient having means for receiving data streams sent by the mobile telephone, means for transmitting data streams to the mobile telephone, and an internal time standard, comprising the following steps:
   A) the mobile telephone transmits a query signal to the recipient,
   B) upon reception of the query signal, the recipient reads out the internal time standard and sends the read-out time data to the mobile telephone,
   C) in the mobile telephone, a time difference delta-t1 between the internal device time and the received time data is calculated and stored,
   D) in an application running in the mobile telephone, an apply time is set to the value of the internal device time minus delta-t1,
   E) a data stream generated by the application is sent to the recipient by pressing a key of the mobile telephone, a component of the data stream including the apply time at the time of pressing the key,
   F) in the recipient, the apply time of step E) is read-out from the received data stream and compared with a predetermined maximum time stored in the recipient,
   G) if the apply time of step F) is earlier than or simultaneous with the maximum time, further processing of the data stream of step E) is carried out, and if the apply time of step F) is later than the maximum time, a first warning signal is generated and assigned to the data stream of step E) and stored.

2. The method according to claim 1, wherein steps A) to C) are carried out several times in succession and cyclic repetition, especially 2, 3, 4 or 5 times in succession and repetition, and for each cycle A) to C) a testdelta-t1 is measured, from all measured testdelta-t1 the smallest testdelta-t1 being calculated and used in step D) is used as delta-t1.

3. The method according to claim 1, wherein steps E) to G) are each repeated several times in cycles, a later maximum time being predetermined for each subsequent cycle and stored in the recipient.

4. The method according to claim 1, wherein if upon reception of the data stream by the recipient, a reception time is read-out in step F) from the internal time standard, and if the reception time determined in step F) is smaller than or equal to the maximum time, further processing of the data stream of step E) takes place, and if the reception time determined in step F) is greater than the maximum time, a second warning signal is generated and assigned to the data stream of step E) and stored.

5. The method according to claim 1, wherein when generating the first warning signal as well as the second warning signal, a final warning signal is generated and assigned to the data stream of step E).

6. The method according to claim 2, wherein steps E) to G) are each repeated several times in cycles, a later maximum time being predetermined for each subsequent cycle and stored in the recipient.

7. The method according to claim 2, wherein if upon reception of the data stream by the recipient, a reception time is read-out in step F) from the internal time standard, and if the reception time determined in step F) is smaller than or equal to the maximum time, further processing of the data stream of step E) takes place, and if the reception time determined in step F) is greater than the maximum time, a second warning signal is generated and assigned to the data stream of step E) and stored.

8. The method according to claim 3, wherein if upon reception of the data stream by the recipient, a reception time is read-out in step F) from the internal time standard, and if the reception time determined in step F) is smaller than or equal to the maximum time, further processing of the data stream of step E) takes place, and if the reception time determined in step F) is greater than the maximum time, a second warning signal is generated and assigned to the data stream of step E) and stored.

9. The method according to claim 6, wherein if upon reception of the data stream by the recipient, a reception time is read-out in step F) from the internal time standard, and if the reception time determined in step F) is smaller than or equal to the maximum time, further processing of the data stream of step E) takes place, and if the reception time determined in step F) is greater than the maximum time, a second warning signal is generated and assigned to the data stream of step E) and stored.

10. The method according to claim 2, wherein when generating the first warning signal as well as the second warning signal, a final warning signal is generated and assigned to the data stream of step E).

11. The method according to claim 3, wherein when generating the first warning signal as well as the second warning signal, a final warning signal is generated and assigned to the data stream of step E).

12. The method according to claim 4, wherein when generating the first warning signal as well as the second warning signal, a final warning signal is generated and assigned to the data stream of step E).

13. The method according to claim 6, wherein when generating the first warning signal as well as the second warning signal, a final warning signal is generated and assigned to the data stream of step E).

14. The method according to claim 7, wherein when generating the first warning signal as well as the second warning signal, a final warning signal is generated and assigned to the data stream of step E).

15. A non-transitory computer-readable medium storing a computer program encoding the steps and step components to be performed in the mobile telephone according to a method according to claim 1, stored in storage means of the mobile telephone.

16. A non-transitory computer-readable medium storing a computer program encoding the steps and step components to be performed in the mobile telephone according to a method according to claim 2, stored in storage means of the mobile telephone.

17. A non-transitory computer-readable medium storing a computer program encoding the steps and step components to be performed in the mobile telephone according to a method according to claim 3, stored in storage means of the mobile telephone.

18. A non-transitory computer-readable medium storing a computer program encoding the steps and step components to be performed in the mobile telephone according to a method according to claim 4, stored in storage means of the mobile telephone.

19. A non-transitory computer-readable medium storing a computer program encoding the steps and step components to be performed in the mobile telephone according to a method according to claim 5, stored in storage means of the mobile telephone.

20. A mobile telephone, comprising a processor system having storage means, wherein in said storage means a program according to claim 15 is stored.

\* \* \* \* \*